(12) United States Patent
Kato et al.

(10) Patent No.: US 9,261,170 B2
(45) Date of Patent: Feb. 16, 2016

(54) CHAIN GUIDE AND CHAIN TRANSMISSION DEVICE

(75) Inventors: Akio Kato, Iwata (JP); Shinji Oishi, Iwata (JP)

(73) Assignee: NTN CORPORATION, Osaka (JP)

( * ) Notice: Subject to any disclaimer, the term of this patent is extended or adjusted under 35 U.S.C. 154(b) by 24 days.

(21) Appl. No.: 14/236,382

(22) PCT Filed: Jul. 30, 2012

(86) PCT No.: PCT/JP2012/069297
§ 371 (c)(1),
(2), (4) Date: Jan. 31, 2014

(87) PCT Pub. No.: WO2013/018749
PCT Pub. Date: Feb. 7, 2013

(65) Prior Publication Data
US 2014/0179472 A1 Jun. 26, 2014

(30) Foreign Application Priority Data
Aug. 3, 2011 (JP) .................. 2011-170047

(51) Int. Cl.
| F16H 7/12 | (2006.01) |
| F16H 7/08 | (2006.01) |
| F16H 7/18 | (2006.01) |
| F16H 7/20 | (2006.01) |

(52) U.S. Cl.
CPC .. *F16H 7/08* (2013.01); *F16H 7/18* (2013.01); *F16H 7/20* (2013.01); *F16H 7/1281* (2013.01); *F16H 2007/0865* (2013.01); *F16H 2007/0893* (2013.01)

(58) Field of Classification Search
CPC ............. F16H 2007/0874; F16H 2007/0893; F16H 7/1254; F16H 2007/088; F16H 7/08
USPC ......................... 474/135, 134, 137
See application file for complete search history.

(56) References Cited

U.S. PATENT DOCUMENTS 1,338,293 A * 4/1920 Fuchs ........................ 474/134
1,919,315 A * 7/1933 Baker et al. .................. 305/154

(Continued)

FOREIGN PATENT DOCUMENTS

| JP | 09-236157 | 9/1997 |
| JP | 2001-187948 | 7/2001 |

(Continued)

OTHER PUBLICATIONS

International Search Report issued Oct. 9, 2012 in International (PCT) Application No. PCT/JP2012/069297.

*Primary Examiner* — Henry Liu
(74) *Attorney, Agent, or Firm* — Wenderoth, Lind & Ponack, L.L.P.

(57) ABSTRACT

A chain guide is provided by which a chain can be guided silently. The chain guide includes: a guide base arranged along a portion of the outer periphery of a chain for transmitting torque and elongated in the direction in which the chain travels; a plurality of roller shafts spaced apart from each other in the longitudinal direction of the guide base; and a plurality of rollers for guiding the chain. The rollers are rotatably supported by the respective roller shafts. The rollers guide the chain by rolling. An arrangement interval between each adjacent pair of the rollers is set such that any two of the pins by which pieces of the chain are joined together do not pass any two of the rollers at the same time.

7 Claims, 8 Drawing Sheets

(56) References Cited

U.S. PATENT DOCUMENTS

| | | | | |
|---|---|---|---|---|
| 3,930,323 | A * | 1/1976 | Marold et al. | 37/423 |
| 4,141,245 | A * | 2/1979 | Brandstetter | 73/862.46 |
| 4,361,363 | A * | 11/1982 | Livesay | 305/125 |
| 6,165,089 | A * | 12/2000 | McGreal et al. | 474/101 |
| 6,179,740 | B1 * | 1/2001 | Walker | 474/134 |
| 6,346,057 | B1 * | 2/2002 | Edelmann | 474/135 |
| 6,592,481 | B2 * | 7/2003 | Sato et al. | 474/134 |
| 2008/0070730 | A1 * | 3/2008 | Nelson et al. | 474/134 |
| 2008/0070731 | A1 * | 3/2008 | Vrsek et al. | 474/134 |
| 2011/0294612 | A1 * | 12/2011 | Kato | 474/91 |

FOREIGN PATENT DOCUMENTS

| | | |
|---|---|---|
| JP | 2011-058551 | 3/2011 |
| WO | 2010/090139 | 8/2010 |

* cited by examiner

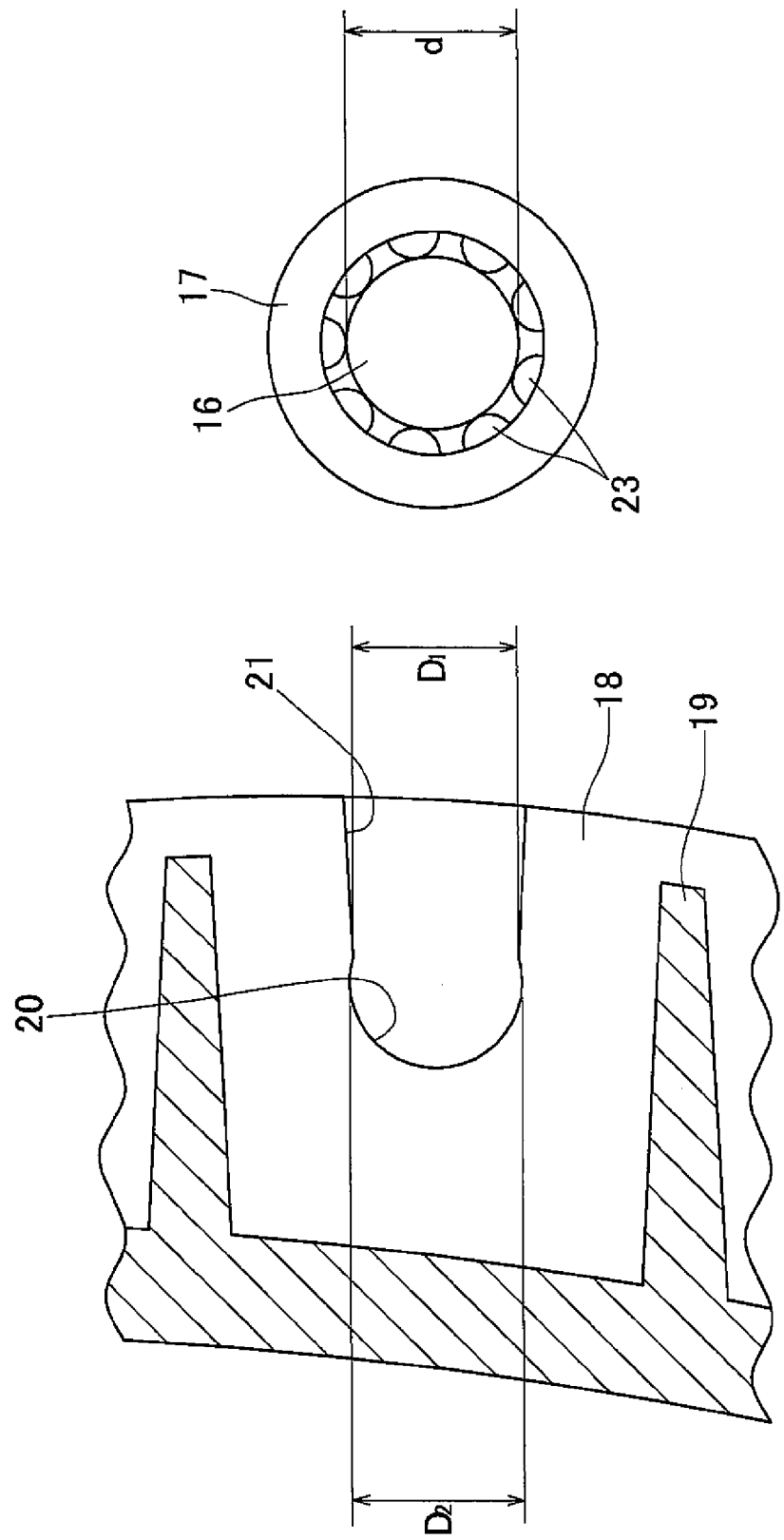

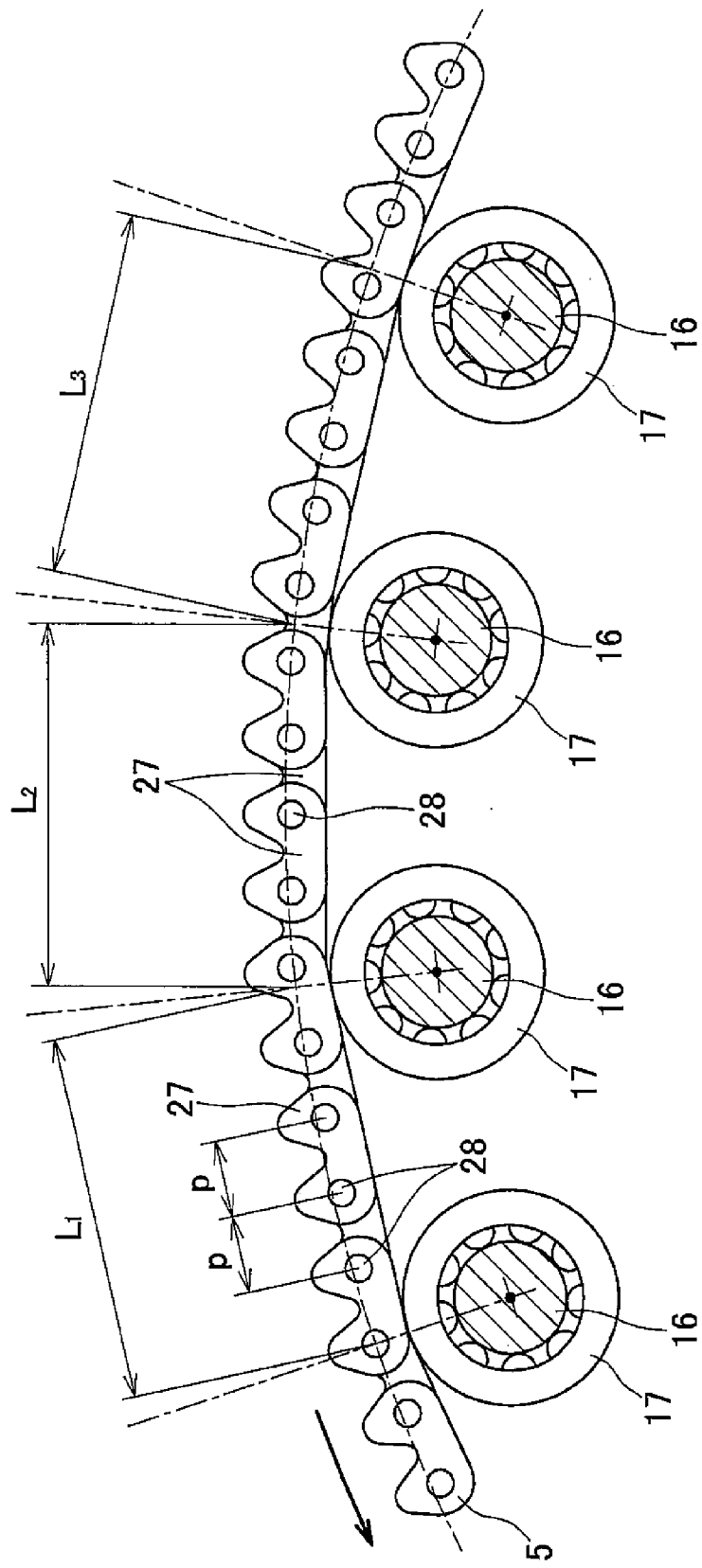

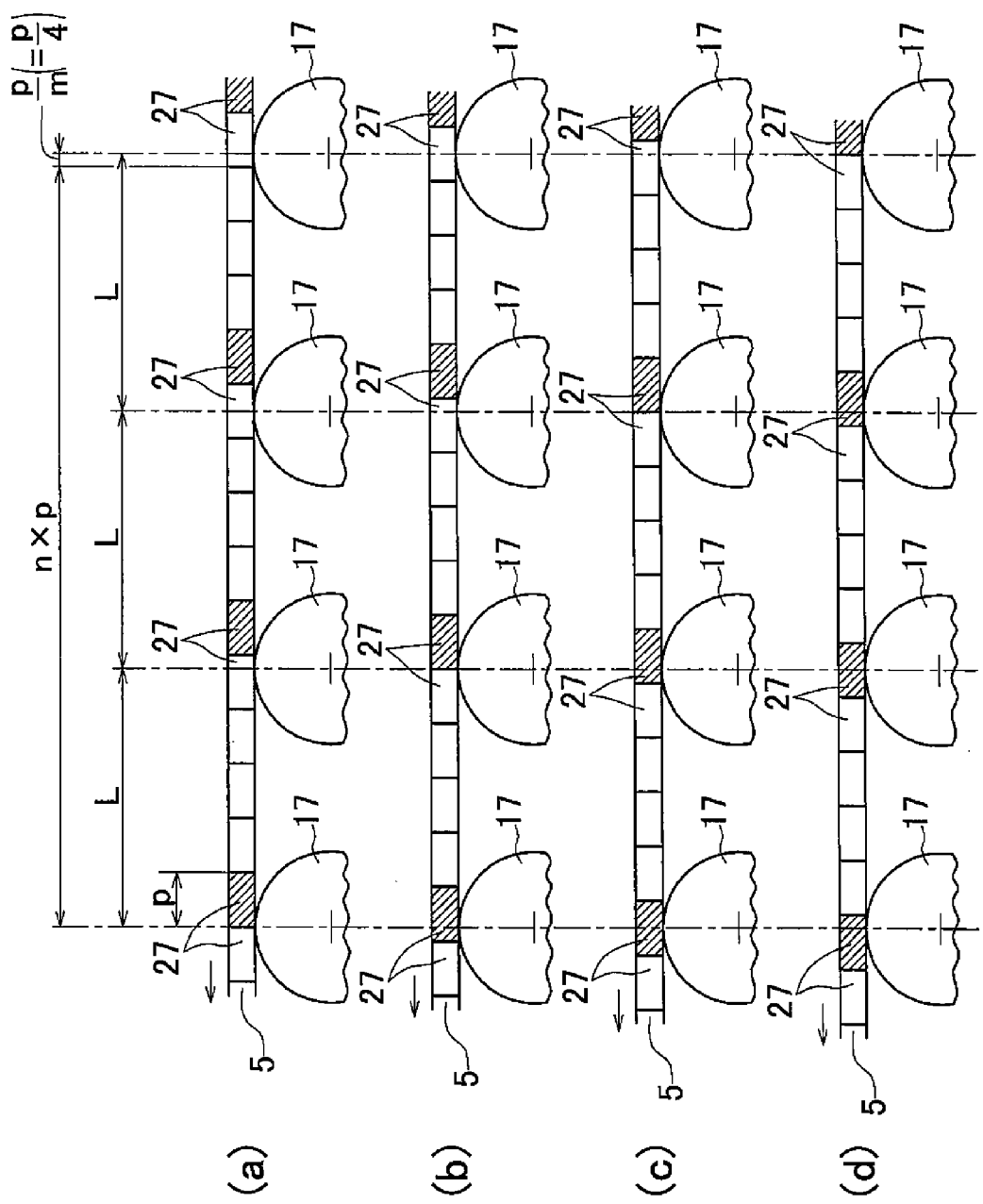

CHAIN GUIDE AND CHAIN TRANSMISSION DEVICE

TECHNICAL FIELD

The present invention relates to a chain guide for guiding the movement of a chain for transmitting torque, and to a chain transmission device using the chain guide.

In an automobile engine, rotation of a crankshaft is transmitted to a camshaft by means of a timing chain (hereinafter, simply referred to as a "chain"), to open and close valves of combustion chambers by rotating the camshaft.

Chain transmission devices are used to drive such camshafts. Many of such chain transmission devices include a driving sprocket attached to the crankshaft; a driven sprocket attached to the camshaft, a chain trained around the driving sprocket and the driven sprocket, a pivotable chain guide arranged along the outer periphery of the loose side of the chain, a chain tensioner pressing the chain guide against the chain, and a fixed chain guide arranged along the outer periphery of the tension side of the chain.

The pivotable chain guide is biased by the chain tensioner, so as to press the chain. As a result thereof, tension of the chain is kept constant. The fixed chain guide controls vibration of the chain while keeping an ideal travelling line of the chain.

As the pivotable chain guide or the fixed chain guide, which are used in the above chain transmission devices, a sliding type is known in which guiding surfaces of the chain guides extending along the travel direction of the chain are brought into sliding contact with the chain. Since the chain guides of this type are in sliding contact with the chain, resistance to travelling of the chain is large. Therefore, transmission loss of torque is large.

In order to overcome this problem, the inventors of the present invention have proposed in PCT International Publication No. 2010/090139 a chain guide including a plurality of spaced apart rollers provided along the travel direction of the chain such that the chain is guided by the respective rollers.

Since this chain guide is in rolling contact with the chain (rolling type), resistance to travelling of the chain is small. Therefore, transmission loss of torque is small.

In order to evaluate performance of the chain guide of the above rolling type, the inventors of the present invention performed an experiment. Specifically, the inventors first prepared a testing machine in which a chain is trained around a driving sprocket attached to a crankshaft and a driven sprocket attached to a camshaft such that the movement of the chain is guided by the chain guide of the rolling type, and performed the experiment, in which the crankshaft of the testing machine was rotated in the range of 500 to 6500 rpm.

As a result of the experiment, the inventors could confirm that resistance to traveling of the chain can be reduced by approximately 20 to 50% by means of the chain guide of the rolling type compared to a chain guide of a sliding type. However, the inventors also discovered that traveling sound of the chain is likely to become loud due to use of the chain guide of the rolling type compared to the chain guide of the sliding type.

The cause of this loud traveling sound of the chain can be considered as follows. Namely, when the chain travels in rolling contact with rollers, vibrations may arise between the chain and the respective rollers when the joined portions of adjacent pieces of the chain contact and pass the rollers. Since the (single) chain travels contacting the plurality of rollers at the same time, vibration of the chain is amplified by vibrations generated between the chain and the respective rollers being combined with each other.

SUMMARY OF THE INVENTION

It is an object of the present invention to provide a chain guide by which a chain can be guided silently.

In order to achieve the above object, the present invention provides a chain guide comprising: a guide base arranged along a portion of the outer periphery of a chain for transmitting torque and elongated in the direction in which the chain travels; a plurality of roller shafts spaced from each other in the longitudinal direction of the guide base; and a plurality of rollers for guiding the chain, the rollers being rotatably supported by the respective roller shafts, wherein the plurality of rollers guide the chain by rolling, wherein an arrangement interval between each adjacent pair of the rollers is set such that any two of pins by which pieces of the chain are joined together do not pass any two of the plurality of rollers at the same time. Due to the above configuration, vibrations generated when the joined portions of adjacent pieces contact and pass the rollers do not occur at the same time. Therefore, vibration of the chain is less likely to be amplified, so that traveling sound of the chain can be reduced.

In order that any two of the pins by which the pieces of the chain are joined together never pass any two of the plurality of rollers at the same time, for example, arrangement intervals between the adjacent rollers can be set as follows. Namely, if p is a pitch of the chain and m is the number of the rollers, for any of integers i from 1 to (m−1), an arrangement interval Li between i-th and (i+1)-th ones of the rollers (17) with respect to the direction in which the chain travels is set to satisfy the following formula:

$$Li \neq n \times p \, (n: \text{integer})$$

If an arrangement interval between each adjacent pair of rollers is set as described above, when any of the joined portions of two adjacent pieces passes a particular roller, another joined portion does not pass a roller adjacent to this particular roller. As a result thereof, vibrations generated when the joined portions of adjacent pieces contact and pass any adjacent rollers do not occur at the same time. Therefore, vibration of the chain is less likely to be amplified, so that traveling sound of the chain can be reduced. In this case, the arrangement intervals Li between the adjacent pairs of rollers may be equal to or not equal to each other.

In order that any two of the joined portions of two adjacent pieces of the chain never pass any two of the plurality of rollers at the same time, it is more preferable that an arrangement interval between each adjacent pair of the rollers is set as follows. Namely, if p is the pitch of the chain and m is the number of rollers, for any combination (i.e., all combinations) of integer s and t that satisfy the formulas:

$$s \leq t; \, 1 \leq s \leq m-1; \, 1 \leq t \leq m-1,$$

the arrangement interval Li between the i-th and (i+1)-th rollers with respect to the moving direction of the chain is set to satisfy the following formula:

$$\sum_{i=s}^{t} Li \neq n \times p \, (n: \text{integer})$$

If an arrangement interval between each adjacent pair of the rollers is set as described above, when a joined portion of two adjacent pieces passes a roller, all of the remaining joined portions are not in contact with any rollers. As a result thereof, vibrations generated when joined portions of respective pieces contact and pass any two of the rollers do not occur at the same time. Therefore, it is possible to very effectively prevent vibration of the chain from being amplified and thus to minimize traveling sound of the chain. In this case, the arrangement intervals Li between the adjacent pairs of rollers may be equal to or not equal to each other.

In case the arrangement intervals between the adjacent pairs of rollers are set to be equal to each other, it is preferable to set the arrangement intervals therebetween as described below so that any two of the joined portions of respective pieces of the chain do not pass any two of the plurality of rollers at the same time. Namely, the arrangement intervals L between the adjacent rollers are set to satisfy the following formula:

$$L \times (m-1) = n \times p + p/m (n: \text{integer}),$$

where p is the pitch of the chain, and m is the number of rollers.

If the arrangement intervals between the adjacent rollers are set in this way, the timing when a joined portion of two pieces passes any particular roller is deviated from the timing when a joined portion of other two pieces passes a roller adjacent to the above particular roller such that the deviations are all equal to each other. As a result thereof, traveling sound of the chain is made so as to be not an unpleasant tap sound but a smooth continuous sound. Therefore, it is possible to effectively soften an unpleasant sound.

The guide base can include a pair of side plates supporting respective ends of the respective roller shafts and elongated in the direction in which the chain travels, and a plurality of coupling portions which are arranged between the adjacent roller shafts and through which the pair of side plates are coupled together.

The present invention also provides a chain transmission device in which the above chain guide is used, the device including: the chain trained about a driving sprocket and driven sprockets; the above pivotable chain guide provided along the outer periphery of the loose side of the chain; and a chain tensioner configured to press the chain guide against the chain.

In case a fixed chain guide is further provided to the outer periphery of the tension side of the chain, the above chain guide can be used as the fixed chain guide.

In the chain guide of the present invention, arrangement intervals between adjacent rollers are set such that any two of pins by which respective pieces of the chain are joined together never pass any two of the plurality of rollers at the same time. As a result thereof, vibrations generated when joined portions of respective pieces contact and pass any two of the rollers occurs separately, so that vibration of the chain is less likely to be amplified. Therefore, traveling sound of the chain can be reduced, so that the chain can be guided silently.

BRIEF DESCRIPTION OF THE DRAWINGS

FIG. 7 is an exploded front view of a portion of a guide base and the roller.

FIG. 8 is a view illustrating the relationship between arrangement intervals of the rollers and pitches of a chain as one example.

FIGS. 9(a) to 9(d) are schematic diagrams illustrating the relationships of arrangement intervals between the rollers and pitches of the chain as one example in a case where the rollers are arranged at equal intervals. Specifically, FIG. 9(a) illustrates a situation in which a joined portion of two adjacent pieces of the chain passes the first roller with respect to the moving direction of the chain, FIG. 9(b) illustrates a situation in which the chain travels by 1/4 pitch from the situation in FIG. 9(a), FIG. 9(c) illustrates a situation in which the chain travels by 1/4 pitch from the situation in FIG. 9(b), and FIG. 9(d) illustrates a situation in which the chain travels by 1/4 pitch from the situation in FIG. 9(c).

DETAILED DESCRIPTION OF THE INVENTION

Figure 1:
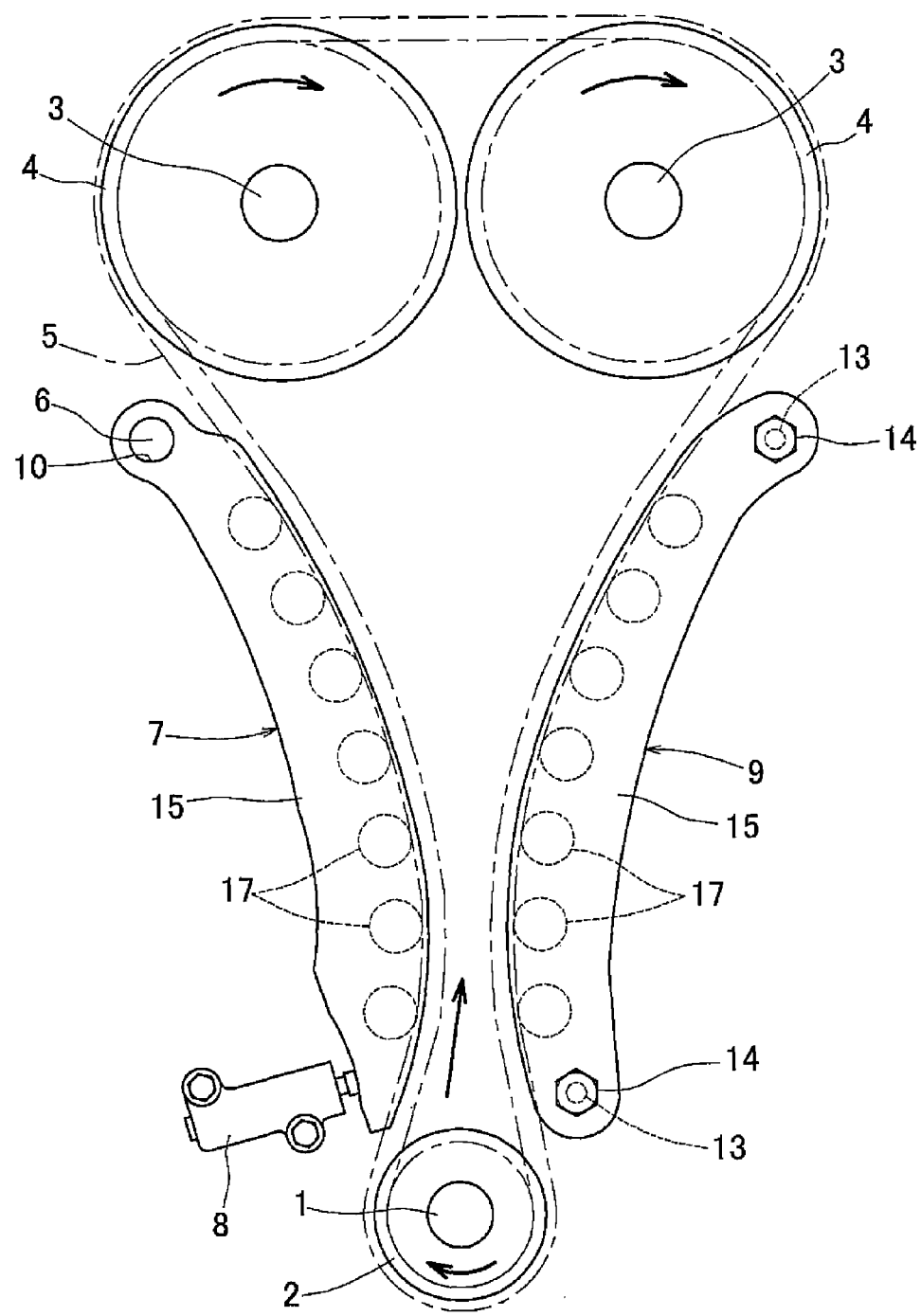
FIG. 1 is a schematic diagram of a chain transmission device according to an embodiment of the present invention.

FIG. 1 illustrates a chain transmission device in which the chain guides according to the embodiment of the present invention are incorporated. This chain transmission device includes a driving sprocket 2 fixed to a crankshaft 1 of an engine, driven sprockets 4 fixed to respective camshafts 3, and a chain 5 trained around the driving sprocket 2 and the driven sprockets 4. Rotation of the crankshaft 1 is transmitted to the camshafts 3 by means of the chain 5 to open and close valves of combustion chambers (not illustrated in the drawings) by rotating the camshafts 3.

The crankshaft 1 always rotates in the same direction (clockwise direction in FIG. 1) while the engine is operating. While the crankshaft 1 is rotating, a portion of the chain is pulled by the driving sprocket 2 and becomes tensioned. This portion of the chain is therefore called the "tension side". Another portion of the chain is pushed by the driving sprocket 2 and becomes loose. This portion is therefore called the "loose side". The chain transmission device includes a chain guide 7 arranged along the outer periphery of the loose side of the chain and pivotally supported by a fulcrum shaft 6, and a chain tensioner 8 pressing the chain guide 7 against the chain 5. The chain transmission device further includes a fixed chain guide 9 arranged along the outer periphery of the tension side of the chain 5.

The chain guide 7 has an elongated shape extending up and down along the chain 5. The fulcrum shaft 6 is inserted in an inserting hole 10 formed in the upper end portion of the chain guide 7 and supports the chain guide 7 so as to be pivotable about the fulcrum shaft 6. The chain tensioner 8 is in contact with the swingable end portion of the chain guide 7, i.e. the portion remote from the fulcrum shaft 6, such that the chain guide 7 is pressed against the chain 5 by the chain tensioner 8.

The chain guide 9 has an elongated shape extending up and down along the chain 5, as well as the chain guide 7. A bolt 14 is inserted in an inserting hole 13 each formed in the upper and lower end portions of the chain guide 9 such that the chain guide 9 is fixed by means of fastening of the bolt 14.

The pivotable chain guide 7 and the fixed chain guide 9 are different from each other in that the pivotable chain guide 7 is formed at one end thereof with the inserting hole 10 for inserting the fulcrum shaft 6 such that the chain guide 7 is pivotable about the fulcrum shaft 6, while the fixed chain guide 9 is formed at both ends thereof with the inserting holes 13 for inserting the bolts 14 used to fix the chain guide 9. However, the chain guides 7 and 9 are otherwise structurally identical.

Therefore, description of only the pivotable chain guide 7 is now made, and as for elements corresponding to those of the chain guide 7, the same reference numerals used in the chain guide 7 are used in the fixed chain guide 9, and their description is omitted.

Figure 2:
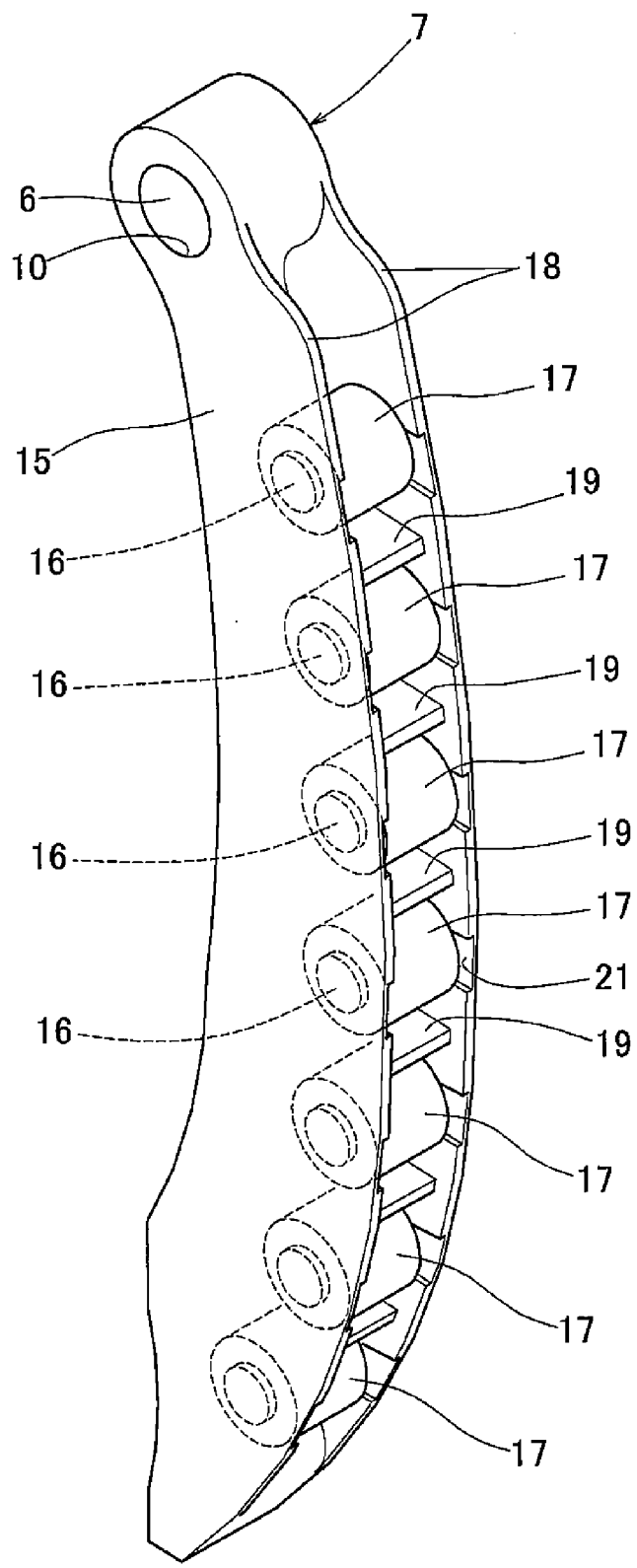
FIG. 2 is a perspective view of any one of the chain guides illustrated in FIG. 1.
Figure 3:
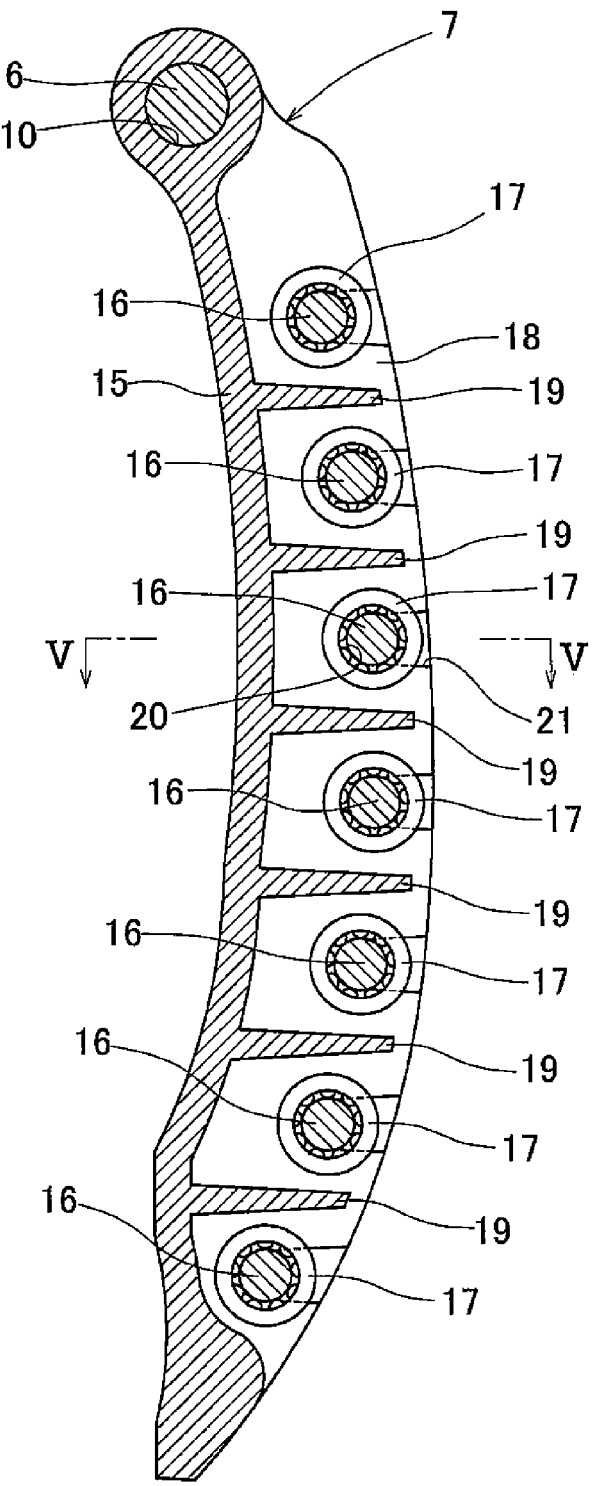
FIG. 3 is a longitudinal sectional view of the chain guide illustrated in FIG. 2.
Figure 4:
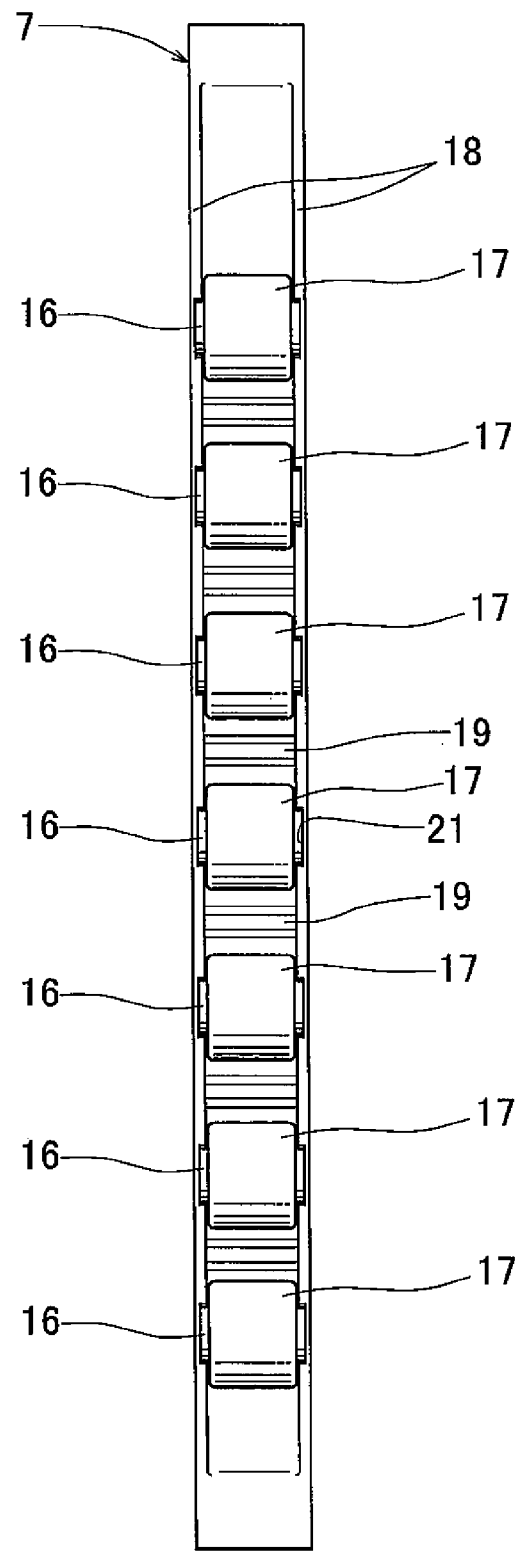
FIG. 4 is a right side view of the chain guide illustrated in FIG. 3.

As illustrated in FIGS. 2 to 4, the chain guide 7 includes a guide base 15 having a shape extending along the direction in which the chain 5 travels, a plurality of spaced apart roller shafts 16 provided in the longitudinal direction of the guide base 15, and rollers 17 rotatably supported by the respective roller shafts 16 for guiding the chain.

The guide base 15 includes a pair of opposed side plates 18 elongated in the direction of movement of the chain 5 and supporting both ends of the respective roller shafts 16, and coupling portions 19 which are arranged between the adjacent roller shafts 16 and through which the side plates 18 are coupled together. The respective coupling portions 19 are at both ends thereof fixed to or integral with the side plates 18 so as to retain the distance between the opposed side plates 18. As illustrated in FIG. 3 and FIG. 7, the respective side plates 18 are formed in their inner opposed surfaces with circular recesses 20 supporting the axial ends of the respective roller shafts 16, and with shaft introducing grooves 21 extending to the respective circular recesses 20 from the convex edges of the respective side plates 18.

As illustrated in FIG. 7, each of the shaft introducing grooves 21 is formed in a tapered shape such that the groove width thereof decreases toward the circular recess 20 from the convex edge of the side plate 18. The ends of the roller shafts 16 are each passed through the shaft introducing groove 21 and introduced into the circular recess 20. In order to prevent the end of the roller shaft 16 in each of the circular recesses 20 from moving back into the shaft introducing groove 21, the shaft introducing groove 21 is formed such that the width D1 of the narrowest portion of the shaft introducing groove 21 is smaller than the inner diameter D2 of the circular recess 20.

The inner diameter D2 of the circular recess 20 is slightly smaller than the outer diameter d of the end portions of the roller shaft 16 such that the ends of the roller shaft 16 are fitted in the circular recesses 20 with an interference.

The guide base 15 can be formed by injection molding of a fiber-reinforced synthetic resin. The synthetic resin forming the guide base 15 can be, for example, polyamide (PA) such as nylon 66 or nylon 44. The reinforcing fiber mixed in the synthetic resin may be glass fiber, carbon fiber or aramid fiber, and so on. The guide base 15 may be formed of light metal such as an aluminum alloy or a magnesium alloy.

The roller shaft 16 is a solid and columnar member made of, e.g., a steel material such as SUJ2 or SC material (carbon steel for machine construction). Heat treatment is performed to the roller shaft 16 so as to enhance wear resistance of the surface of the roller shaft. The heat treatment may be, for example, bright quenching, induction quenching, carburizing and quenching.

Figure 5:
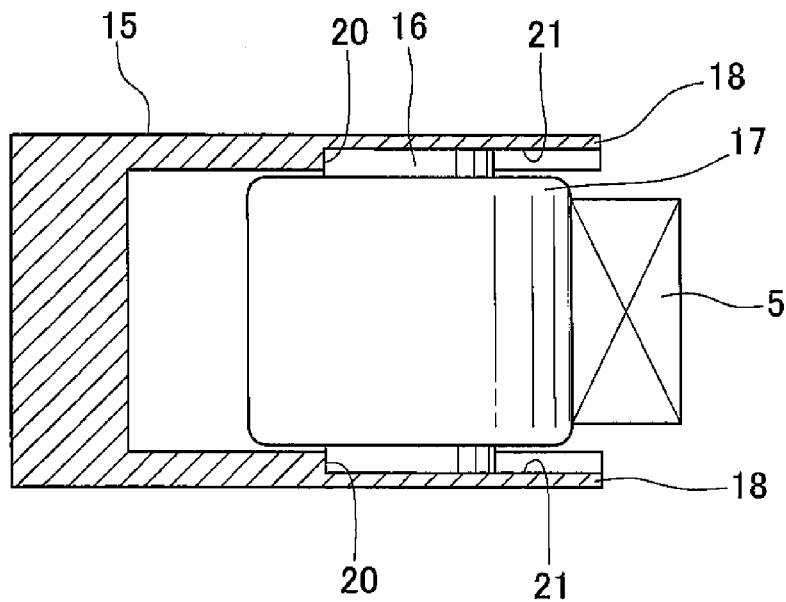
FIG. 5 is a sectional view taken along the line V-V of FIG. 3.
Figure 6:
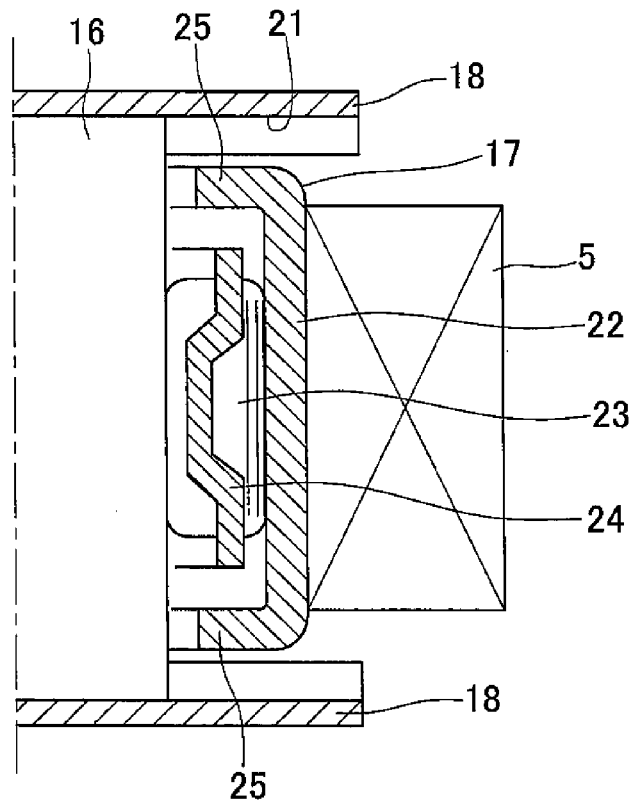
FIG. 6 is an enlarged sectional view of the roller illustrated in FIG. 5.

As illustrated in FIG. 5 and FIG. 6, the rollers 17 are rotatably mounted on the outer peripheries of the roller shafts 16 such that the cylindrical surfaces formed on the outer peripheries of the rollers 17 contact the chain 5. The rollers 17 are roller bearings each including an outer race 22, a plurality of roller elements 23 incorporated in the outer race 22, and a retainer 24 retaining the roller elements 23. The outer race 22 is a shell type (i.e. cup-shaped) outer race formed by drawing a steel plate such as SPC or SCM. Inwardly extending flanges 25 are formed at both ends of the outer race 22.

In this embodiment, the rollers 17 each consist only of a roller bearing so as to lighten the rollers 17 and thus minimize resistance to traveling of the chain 5. However, the roller 17 may further include a cylindrical member made of resin or iron and attached to the outer periphery of the outer race 22 of the roller bearing, and bearings of other types can be used as the roller bearing. The roller bearing described above indicates a cylindrical roller bearing or a needle roller bearing.

As illustrated in FIG. 8, arrangement intervals between the plurality of rollers 17 are set such that any two of the pins 28 by which the respective pieces 27 forming the chain 5 are joined together never pass any two of the plurality of rollers 17 at the same time. This means that when any of the pins 28 is on the straight line drawn toward the point where a roller 17 contacts the chain 5 from the central point of the roller 17, none of the remaining pins 28 is on any of the straight lines drawn toward the points where the remaining respective rollers 17 contact the chain 5 from the central points of the remaining respective rollers 17.

In particular, the arrangement intervals between the rollers 17 can be set as follows. Namely, if p is the pitch of the chain 5 and m is the number of rollers 17, for any of the integers i from 1 to (m−1), the arrangement interval Li between the i-th and (i+1)-th rollers 17 with respect to the moving direction of the chain 5 is set to satisfy the following formula:

$$Li \neq n \times p \, (n: \text{integer})$$

While seven rollers 17 are illustrated in FIGS. 1 to 4, less than seven rollers are used in the following description in order to facilitate understanding of the relationship between the arrangement interval Li of the rollers 17 and the pitch p of the chain 5.

As illustrated in FIG. 8, for example, in case the number m of the rollers 17 is four, and the pitch p of the chain 5 is 6 mm, the arrangement interval $L_1$ between the first roller 17 and the second roller 17 is set to satisfy the following formula:

$$L_1 \neq 6n \, (n: \text{integer}),$$

the arrangement interval $L_2$ between the second roller 17 and the third roller 17 is set to satisfy the following formula:

$$L_2 \neq 6n \, (n: \text{integer}), \text{ and}$$

the arrangement interval $L_3$ between the third roller 17 and the fourth roller 17 is set to satisfy the following formula:

$$L_3 \neq 6n \, (n: \text{integer})$$

The pitch p of the chain 5 indicates the distance between the centers of any adjacent pins 28, which bendably join the adjacent pieces 27 together. The arrangement interval Li between each adjacent pair of rollers 17 indicates the distance between any adjacent apexes of the (polygonal) trajectory of any pin 28 when the chain 5 travels.

Description is now made of how the chain transmission device configured as described above operates.

While the engine is operating, the chain 5 travels between the driving sprocket 2 and the driven sprockets 4 such that torque is transmitted to the camshafts 3 from the crankshaft 1 by means of the chain 5. At this time, the pivotable chain guide 7, biased by the chain tensioner 8, presses the chain 5, so that the tension of the chain 5 is kept constant, and the fixed chain guide 9 controls vibration of the chain 5 while keeping an ideal travelling line of the chain 5.

At this time, the respective rollers 17 of the chain guides 7 and 9 rotate while contacting the edges of the back portions of the pieces 27 of the chain 5 so that the chain 5 is guided in rolling contact with the rollers 17. Since the chain 5 is in rolling contact with the chain guides 7 and 9, resistance to travelling of the chain 5 is small. Therefore, transmission loss of torque is small.

When the chain 5 travels in rolling contact with the rollers 17, vibrations may arise between the chain 5 and the respective rollers 17 when the joined portions of the adjacent pieces 27 of the chain 5 (where there are the pins 28) contact and pass the rollers 17. Since the (single) chain 5 travels contacting the plurality of rollers 17 at the same time, vibration of the chain 5 may be amplified by vibrations generated between the chain 5 and the respective rollers 17 being combined with each other.

In the chain transmission device of this embodiment, the arrangement interval Li between each adjacent pair of rollers 17 is set such that when any of the pins 28 by which two adjacent pieces 27 are joined together passes a particular roller 17, another pin 28 does not pass a roller 17 adjacent to this particular roller 17. As a result thereof, vibrations generated when the joined portions of adjacent pieces 27 contact and pass any adjacent rollers 17 do not occur at the same time. Therefore, vibration of the chain 5 is less likely to be amplified, so that traveling sound of the chain 5 can be reduced.

It is more preferable that the arrangement interval Li between any adjacent pair of rollers 17 is set as follows. Namely, if p is the pitch of the chain 5 and m is the number of rollers 17, for any combination of integer s and t that satisfy the formulas:

$s \leq t; 1 \leq s \leq m-1; 1 \leq t \leq m-1$, the arrangement interval Li between the i-th and (i+1)-th rollers 17 with respect to the moving direction of the chain 5 is set to satisfy the following formula:

$$\sum_{i=s}^{t} Li \neq n \times p \text{ (}n\text{: integer)}$$

For example, if the number m of rollers 17 is four, all possible combinations (s, t) of the integers s and t that satisfy the formula $s \leq t; 1 \leq s \leq 3; \text{ and } 1 \leq t \leq 3$ are (1, 1), (1, 2), (1, 3), (2, 2), (2, 3), and (3, 3). If the pitch p of the chain 5 is 6 mm, the arrangement interval $L_1$ between the first roller 17 and the second roller 17, the arrangement interval $L_2$ between the second roller 17 and the third roller 17, and the arrangement interval $L_3$ between the third roller 17 and the fourth roller 17 are set to satisfy the following formulas (n: integer):

$L_1 \neq 6n$ (corresponding to ($s=1,t=1$))

$L_1+L_2 \neq 6n$ (corresponding to ($s=1,t=2$))

$L_1+L_2+L_3 \neq 6n$ (corresponding to ($s=1,t=3$))

$L_2 \neq 6n$ (corresponding to ($s=2,t=2$))

$L_2+L_3 \neq 6n$ (corresponding to ($s=2,t=3$))

$L_3 \neq 6n$ (corresponding to ($s=3,t=3$))

If the arrangement interval Li between any adjacent rollers 17 is set as described above, when a pin 28 by which each adjacent pair of pieces 27 are joined together passes a roller 17, all of the remaining rollers 17 are not in contact with any pins 28. As a result thereof, vibrations generated when joined portions of respective pieces 27 contact and pass any two of the rollers 17 do not occur at the same time. Therefore, it is possible to very effectively prevent vibration of the chain 5 from being amplified and thus to minimize traveling sound of the chain 5. In this case too, the arrangement intervals Li between the adjacent pairs of rollers 17 may be equal to or not equal to each other.

In each of the above "not equal to ($\neq$)" formulas, it is preferable that the left and right sides are different from each other by 10% or more of the pitch p of the chain 5, and more preferable that the left and right sides are different from each other by 20% or more of the pitch p thereof. In such a case, since the chain 5 normally elongates by less than 1% over time, it is possible to stably control traveling sound of the chain 5 even though the chain 5 elongates over time.

If the arrangement intervals between the adjacent rollers 17 are equal to each other, it is preferable to set the arrangement intervals as follows. Namely, the arrangement intervals L between the adjacent rollers 17 are set to satisfy the following formula:

$L \times (m-1) = n \times p + p/m$ (n: integer), where p is the pitch of the chain 5, and m is the number of rollers 17.

For example, if the number m of rollers 17 is four, the arrangement intervals L between the adjacent rollers 17 are set to satisfy the following formula:

$L \times 3 = n \times p + p/4$ (n: integer)

FIGS. 9(a) to 9(d) each illustrate the relationship between the chain 5 and rollers 17 in a case where the arrangement intervals L between the adjacent rollers 17 are set to satisfy the above formula.

As illustrated in FIG. 9(a), while a first joined portion of two adjacent pieces 27 is passing the first roller 17 with respect to the moving direction of the chain 5, a second joined portion of two adjacent pieces 27 is away by 1/4 pitch from the second roller 17, a third joined portion of two adjacent pieces 27 is away by 2/4 pitch from the third roller 17, and a fourth joined portion of two adjacent pieces 27 is away by 3/4 pitch from the fourth roller 17, each in the direction opposite to the moving direction of the chain 5.

As illustrated in FIG. 9(b), when the chain 5 travels by 1/4 pitch from the situation in FIG. 9(a), the second joined portion thereof passes the second roller 17. As illustrated in FIG. 9(c), when the chain 5 travels by 1/4 pitch further from the situation in FIG. 9(b), the third joined portion thereof passes the third roller 17. As illustrated in FIG. 9(d), when the chain 5 travels by 1/4 pitch further from the situation in FIG. 9(c), the fourth joined portion thereof passes the fourth roller 17. When the chain 5 travels by 1/4 pitch further from the situation in FIG. 9(d), the first joined portion thereof passes again the first roller 17 as illustrated in FIG. 9(a). Whenever the chain 5 travels by 1/4 pitch afterward, the situations in FIGS. 9(a) to 9(d) are repeated subsequently.

If the arrangement intervals L between the adjacent rollers 17 are set to satisfy the above formula in this way, the timing when a joined portion of two pieces 27 passes any particular roller 17 is deviated from the timing when a joined portion of other two pieces 17 passes a roller adjacent to the above particular roller 17 such that the deviations are all equal to each other (corresponding to the interval of 1/m pitch of the chain 5, which is 1/4 pitch of the chain 5 in the above example.). As a result thereof, traveling sound of the chain 5 is made to be not an unpleasant tap sound but a smooth continuous sound. Therefore, it is possible to effectively soften an unpleasant sound.

The left and right sides in the above equality do not need to be equal to each other strictly in a mathematical sense in setting the arrangement intervals L between the adjacent rollers 17. It is sufficient that the left and right sides are equal to each other to the extent that traveling sound of the chain 5 is made a smooth continuous sound (namely, the difference between the left and right sides is made less than 0.1 times larger than the pitch p of the chain 5), and more suitably that the difference therebetween is made less than 0.05 times larger than the pitch p of the chain 5. In such a case, traveling sound of the chain 5 is made to be an extremely smooth continuous sound.

Though the chain 5 illustrated in FIG. 8, by which rotation of the crankshaft 1 is transmitted to the camshafts 3, is a silent chain, the present invention can apply to a roller chain or a bush chain which is a roller chain having no rollers.

The invention claimed is:

1. A chain guide comprising:
a guide base arranged along a portion of an outer periphery of a chain, comprising chain pieces joined together by chain pins, for transmitting torque, the guide base being elongated in a direction in which the chain travels;
a plurality of roller shafts spaced from each other in a longitudinal direction of the guide base; and
a plurality of rollers for guiding the chain, the rollers being rotatably supported by the respective roller shafts,
wherein the plurality of rollers guide the chain by rolling, and
wherein an arrangement interval between each adjacent pair of the rollers is set such that any two of the pins by which the pieces of the chain are joined together do not pass any two of the plurality of rollers at a same time,
wherein if p is a pitch of the chain and m is the number of the rollers, for all combinations of integers s and t that satisfy the formulas:

$s \leq t; 1 \leq s \leq m-1; 1 \leq t \leq m-1,$ an arrangement interval Li between i-th and (i+1)-th ones of the rollers with respect to the direction in which the chain travels is set to satisfy the following formula:

$$\sum_{i=s}^{t} Li \neq n \times p \ (n: \text{integer}).$$

2. A chain guide comprising:
a guide base arranged along a portion of an outer periphery of a chain, comprising chain pieces joined together by chain pins, for transmitting torque, the guide base being elongated in a direction in which the chain travels;
a plurality of roller shafts spaced from each other in a longitudinal direction of the guide base; and
a plurality of rollers for guiding the chain, the rollers being rotatably supported by the respective roller shafts,
wherein the plurality of rollers guide the chain by rolling, and
wherein an arrangement interval between each adjacent pair of the rollers is set such that any two of the chain pins by which the chain pieces of the chain are joined together do not pass any two of the plurality of rollers at a same time,
wherein an arrangement interval L between each adjacent pair of the rollers is set to be equal to the arrangement interval L between any other adjacent pair of the rollers, and wherein the arrangement intervals L are set to satisfy the following formula:

$L \times (m-1) = n \times p + p/m \ (n: \text{integer})$ where p is a pitch of the chain, and m is the number of the rollers.

3. A chain transmission device comprising:
a chain trained around a driving sprocket and a driven sprocket;
a pivotable chain guide provided along an outer periphery of a loose side of the chain;
a chain tensioner configured to press the chain guide against the chain; and
a fixed chain guide provided along an outer periphery of a tension side of the chain,
wherein each of the pivotable chain guide and the fixed chain guide is constituted by a chain guide according to claim 1.

4. The chain guide according to claim 1, wherein the guide base includes: a pair of side plates supporting respective ends of the respective roller shafts and elongated in the direction in which the chain travels; and a plurality of coupling portions which are arranged between the adjacent roller shafts and through which the pair of side plates are coupled together.

5. The chain guide according to claim 2, wherein the guide base includes: a pair of side plates supporting respective ends of the respective roller shafts and elongated in the direction in which the chain travels; and a plurality of coupling portions which are arranged between the adjacent roller shafts and through which the pair of side plates are coupled together.

6. A chain transmission device comprising:
a chain trained around a driving sprocket and a driven sprocket;
a pivotable chain guide provided along an outer periphery of a loose side of the chain; and
a chain tensioner configured to press the chain guide against the chain,
wherein the chain guide is the chain guide according to claim 1.

7. A chain transmission device comprising:
a chain trained around a driving sprocket and a driven sprocket;
a pivotable chain guide provided along an outer periphery of a loose side of the chain; and
a chain tensioner configured to press the chain guide against the chain,
wherein the chain guide is the chain guide according to claim 2.

* * * * *